United States Patent
Arai (10) Patent No.: US 7,083,403 B2
(45) Date of Patent: Aug. 1, 2006

(54) APPARATUS FOR SUPPLYING A RESIN MATERIAL TO AN INJECTION MOLDING MACHINE

(75) Inventor: Takashi Arai, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/107,813

(22) Filed: Apr. 18, 2005

(65) Prior Publication Data

US 2005/0181086 A1 Aug. 18, 2005

Related U.S. Application Data

(62) Division of application No. 10/179,875, filed on Jun. 26, 2002.

(30) Foreign Application Priority Data

Jul. 2, 2001 (JP) ............... 2001-201244

(51) Int. Cl.
B29C 44/46 (2006.01)
(52) U.S. Cl. ............ 425/4; 425/400; 425/457; 425/208; 425/562; 264/50; 264/53
(58) Field of Classification Search ......... 425/400, 425/4 R, 130, 457, 208, 562; 264/572, 50, 264/53
See application file for complete search history.

(56) References Cited

U.S. PATENT DOCUMENTS

| 3,268,639 A | 8/1966 | Taft ........................... 264/78 |
| 3,384,691 A | 5/1968 | Weissman et al. ............ 264/47 |
| 3,796,779 A | 3/1974 | Greenburg ................... 264/50 |
| 3,962,387 A | 6/1976 | Hendry ........................ 264/50 |
| 4,444,704 A * | 4/1984 | Hira et al. ................ 264/45.5 |
| 4,473,665 A | 9/1984 | Martini-Vvedesnky et al. ........................... 521/79 |
| 4,752,199 A | 6/1988 | Arai ........................... 425/130 |
| 4,933,115 A * | 6/1990 | Krippl et al. .............. 261/18.1 |
| 5,158,986 A | 10/1992 | Cha et al. .................... 521/82 |
| 5,160,674 A | 11/1992 | Colton et al. ................. 264/50 |
| 5,269,978 A | 12/1993 | Umetsu et al. .............. 264/1.4 |
| 5,308,574 A * | 5/1994 | Yamazaki et al. .......... 264/572 |
| 5,334,356 A | 8/1994 | Baldwin et al. ............ 422/133 |
| 5,391,336 A * | 2/1995 | Akitomo et al. ........... 264/46.4 |
| 5,571,848 A | 11/1996 | Mortensen .................... 521/61 |

(Continued)

FOREIGN PATENT DOCUMENTS

DE 3244037 A * 5/1984

(Continued)

OTHER PUBLICATIONS

Poliakoff, "An Introduction to Supercritical Fluids" (created Jul. 1997, last revised Jan. 2001), pp. 1-3, [retrieved from Internet on Mar. 20, 2005 <www.nottingham.ac.uk/supercritical/scintro.html>].

*Primary Examiner*—Robert Davis
*Assistant Examiner*—G. Nagesh Rao
(74) *Attorney, Agent, or Firm*—Fitzpatrick, Cella, Harper & Scinto (57) ABSTRACT

An apparatus for supplying a resin material to an injection molder comprises a vessel for storing a resin material, gas supplying means for supplying an inert gas to the vessel which is not a super-critical state, and material supplying means for supplying the resin material from the vessel to an injection molder.

2 Claims, 6 Drawing Sheets

U.S. PATENT DOCUMENTS

| | | | |
|---|---|---|---|
| 5,705,201 A * | 1/1998 | Ibar | 425/130 |
| 5,728,325 A * | 3/1998 | Blankenburg | 264/28 |
| 5,820,889 A * | 10/1998 | Erikson | 425/130 |
| 5,866,053 A | 2/1999 | Park et al. | 264/50 |
| 6,432,352 B1 * | 8/2002 | Csongor | 264/572 |
| 6,783,710 B1 * | 8/2004 | Walder | 264/40.7 |

FOREIGN PATENT DOCUMENTS

| | | |
|---|---|---|
| EP | 0 610 953 | 8/1994 |
| EP | 0 765 724 | 4/1997 |
| JP | 56-112945 | 9/1981 |
| JP | 8-085129 | 4/1996 |

* cited by examiner

| | CONDITION 1 | CONDITION 2 | CONDITION 3 | CONDITION 4 | CONDITION 5 |
|---|---|---|---|---|---|
| RESIN MATERIAL | PC/ABS | PPE+PS | ABS | HIPS | PPS |
| DRYING OF MATERIAL | 70°C FOR 120 MIN | 70°C FOR 120 MIN | 70°C FOR 120 MIN | 70°C FOR 120 MIN | 120°C FOR 120 MIN |
| GAS PENETRATION TIME MIN | 120 | 120 | 120 | 120 | 180 |
| TYPE OF SOLUTION | | IPA | | | IPA |
| ADDITIVE AMOUNT OF SOLUTION CC | | 5 | | | 5 |
| HUMIDITY IN VESSEL % | | | | 45 | |
| TYPE OF INERT GAS | NITROGEN GAS | NITROGEN GAS | NITROGEN GAS | NITROGEN GAS | CARBON DIOXIDE GAS |
| TEMPERATURE OF PRESSURE VESSEL °C | 35 | 40 | 35 | 35 | 60 |
| GAS PRESSURE MPa | 3 | 3 | 3 | 3 | 6 |
| PLASTICIZER BACK PRESSURE (MPa) | 2 | 2.5 | 1.5 | 1 | 2.5 |
| TEMPERATURE OF NOZZLE PORTION (°C) | 220 | 260 | 200 | 160 | 270 |
| TEMPERATURE OF PLASTICIZING PORTION (°C) | 210 | 250 | 190 | 150 | 260 |
| TEMPERATURE UNDER HOPPER (°C) | 45 | 45 | 45 | 45 | 45 |
| INJECTION PRESSURE (MPa) | 100 | 110 | 100 | 90 | 120 |
| INJECTION SPEED (m/sec) | 2 | 2 | 2.5 | 2.5 | 2 |
| INJECTION TIME (sec) | 0.8 | 0.9 | 0.7 | 0.6 | 0.8 |
| DWELL PRESSURE (MPa) | 0 | 0 | 0 | 0 | 0 |
| DWELL TIME (sec) | 0 | 0 | 0 | 0 | 0 |
| COOLING TIME (sec) | 8 | 7 | 8 | 8 | 9 |
| MOLDING CYCLE (sec) | 21 | 20 | 21 | 21 | 22 |
| FOAMED PRODUCT WEIGHT (g) OF COMPONENT | 251 | 270 | 231 | 224 | 277 |
| AVERAGE CELL DIAMETER (μm) | 26 | 45 | 33 | 50 | 32 |
| CELLULAR RATE (%) | 11 | 10 | 12 | 9 | 8 |

FIG. 6

APPARATUS FOR SUPPLYING A RESIN MATERIAL TO AN INJECTION MOLDING MACHINE

This is a divisional of application Ser. No. 10/179,875, filed on Jun. 26, 2002.

FIELD OF THE INVENTION

The present invention relates to a method and apparatus which are used in foam molding using an inert gas as a foaming agent to supply a resin material to an injection molder, and a foamed product.

BACKGROUND OF THE INVENTION

Foam molding has a long history. A technique for obtaining a resin foamed product by injection molding is disclosed in, e.g., U.S. Pat. Nos. 3,268,639 and 3,384,691. In recent years, a foam molding method using a chemical or physical foaming agent can be learned from textbooks on synthetic resin molding.

Conventional foam molding has a very high foaming magnification, as is known in foamed styrol, and is accordingly excellent in weight reduction, but lacks mechanical strength. With a chemical foaming agent, a master batch scheme with which a thermally decomposable foaming material and a resin material are mixed immediately before molding is often employed. This leads to many problems such as harmfulness, mold corrosion, degradation in molding environment, and handling difficulty.

Regarding this, U.S. Pat. No. 3,796,779 proposes a foam which is obtained by blowing an inert gas such as carbon dioxide gas into a molten resin material directly so the gas is penetrated into the resin, and cooling the resultant resin. Since an inert gas is used as the foaming agent, harmfulness, mold corrosion, degradation in molding environment, handling difficulty, and the like are solved.

In U.S. Pat. No. 3,796,779 as well, since the gas is directly blown to the molten resin, the resin and the gas are not uniformly mixed, and an island structure with various cell shapes is formed. Then, the strength of the mixture becomes partially low. In this manner, it is very difficult to control the foaming state.

In order to solve these problems, a method of forming a very small foam called a microcell was found at Massachusetts Institute of Technology, USA early 1980. This method and an apparatus for it are disclosed in U.S. Pat. Nos. 4,473,665, 5,158,986, 5,160,674, 5,334,356, 5,571,848, and 5,866,053. According to the method and apparatus proposed by Massachusetts Institute of Technology, USA, a supercritical inert gas is blown to that portion of the plasticizer of an injection molder where a resin is to be fused. The sufficiently molten resin and the gas are mixed by a static mixer. The pressure and temperature are controlled. Consequently, a large number of small cells with a size of 25 μm or less are uniformly dispersed in a resultant foamed product. As the cell size is small, according to these references, a foamed product substantially free from strength degradation can be obtained.

To improve the quality of the outer appearance of the foamed product, the following method is known. That is, when a resin is to be injected into a mold, the mold is filled with a gas in advance so the interior of the mold is pressurized to be equal to or higher than the atmospheric pressure. The resin is injected to fill the mold completely. After that, the gas pressure applied to the interior of the mold is released, so the gas in the resin allows foaming upon pressure reduction.

According to the conventional method, the gas is directly blown into the molten resin material. When the gas is blown, that portion of the molten resin which comes into contact with the gas is quickly cooled. If the gas is blown continuously, a large part of the molten resin is cooled. As a result, the viscosity increases, and it takes time to restore a resin temperature and viscosity suitable for molding.

When the gas is heated to near the melt temperature of the resin in advance, as the temperature increases the volume of the gas increases. If the gas with the increased volume is blown into the resin, as the gas pressure in the resin is low, the foaming magnification after the resin is filled in the mold is very low.

In order to compensate for these defects, a method is available with which the temperature of the gas is increased and simultaneously the pressure is increased. While the gas concentration is maintained, the gas is blown into the molten resin. In this case, the pressure of the gas is very high, and the gas flows into the resin instantaneously when it is blown into the resin. Hence, it is difficult to control the gas blow amount. Since the gas is abruptly blown into the molten resin, the blown molten resin forms two separate layers of the gas and resin. To uniformly disperse the gas in the resin, kneading must be mechanically repeated by a static mixer or the like again. As a result, the apparatus becomes complicated, and the cycle is prolonged, so the productivity is impaired.

Originally, a plasticizer in an injection molder or extruder applies a certain degree of pressure to the molten resin in order to remove air in the material or during metering. If a gas is blown into the molten resin in the conventional manner and metering is performed, the blown gas may be undesirably discharged to the metering zone side of the plasticizer before it is dissolved in the resin completely.

According to the method described above, when the resin is to be injected into the mold, the mold is filled with the gas in advance so the interior of the mold is pressurized to be equal to or higher than the atmospheric pressure. After the resin is filled in the mold, the gas pressure is released. With this method, when the filling speed is high, the pressure of the gas filled in the mold cannot be controlled, and accordingly the filled gas serves as an obstacle to cause a short shot. When the filling speed of the resin is decreased, the gas that fills the mold can be controlled, so pressure control during and after resin filling can be performed. However, as the filling speed is low, that surface of the resin which is in contact with the mold is cooled by the mold and solidified to form a large skin layer. For this reason, in the foaming distribution of the foamed product, the foaming difference becomes very large between the surface and the center in the direction of thickness and between a portion in the vicinity of the gate and the finally filled portion.

According to the so-called master batch scheme, pellets containing a thermally decomposable chemical foaming material and pellets not containing a foaming material are mixed immediately before molding. With this scheme, it is very difficult to uniformly disperse the chemical foaming material during plasticization. Consequently, cells formed in the foamed product are dispersed nonuniformly, and a sufficient strength and precision cannot be obtained.

SUMMARY OF THE INVENTION

The present invention has been made in view of the problems described above, and has as its object to provide a method and apparatus for supplying a resin material to an injection molder which can uniformly disperse cells in a foamed product, and to provide a foamed product.

In order to solve the above problems and to achieve the above object, a method of supplying a resin material to an injection molder according the present invention is characterized by the following process.

More specifically, the method comprises the absorbing step of placing a resin material in a pressurized inert gas in a pressure vessel and allowing the resin material to absorb the inert gas, and the supplying step of supplying the resin material which has absorbed the inert gas to an injection molder.

According to the first aspect of the present invention, an apparatus for supplying a resin material to an injection molder is characterized by the following arrangement.

More specifically, the apparatus comprises extracting means for extracting an inert gas from an atmosphere, pressurizing means for pressurizing the inert gas extracted by the extracting means, a pressure vessel for storing a resin material and the pressurized inert gas, and supplying means for supplying the resin material from the pressure vessel to an injection molder.

According to the second aspect of the present invention, an apparatus for supplying a resin material to an injection molder is characterized by the following arrangement.

More specifically, the apparatus is characterized by comprising extracting means for extracting an inert gas from an atmosphere, pressurizing means for pressurizing the inert gas extracted by the extracting means, a pressure vessel for storing the resin material and the pressurized inert gas, introducing means for introducing a liquid to the pressure vessel, and supplying means for supplying the resin material from the pressure vessel to an injection molder.

A foamed product according to the present invention is characterized in that it is foamed by using the above method or apparatus for supplying a resin material to an injection molder.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described.

The first characteristic feature of this embodiment resides in that it uses an inert gas as a foaming material. Preferably, the foaming material is carbon dioxide gas, nitrogen, argon gas, or the like. As the inert gas is used, harmfulness and undesired influence on the environment are prevented while safety is maintained.

The second characteristic feature resides in that the foaming material is penetrated into a solid-state resin material at a temperature less than a thermal deformation temperature. This solves the conventional problem described above which occurs when the foaming material is mixed in the molten resin.

The third characteristic feature resides in that the inert gas is penetrated into the resin by pressurization. When pressurization is performed to a predetermined pressure, the penetration speed of the inert gas into the resin material can be increased, so the productivity can be improved.

The fourth characteristic feature resides in that a solution is evaporated to come into contact with the resin material, and after that the inert gas is penetrated into the resin material. This can remarkably increase the penetration speed and penetration depth of the inert gas into the resin material, so the productivity and cell formation state (cell population and dispersion properties) are improved.

The fifth characteristic feature resides in that the resin material is held in an appropriate humidity, and after that the inert gas is penetrated into the resin material. Since an appropriate water content is adsorbed by the resin material, the penetration speed of the inert gas into the resin material can be increased. This is very effective for resins except a hydrolyzable resin such as polycarbonate.

One embodiment of the present invention will be described in detail.

Figure 1:
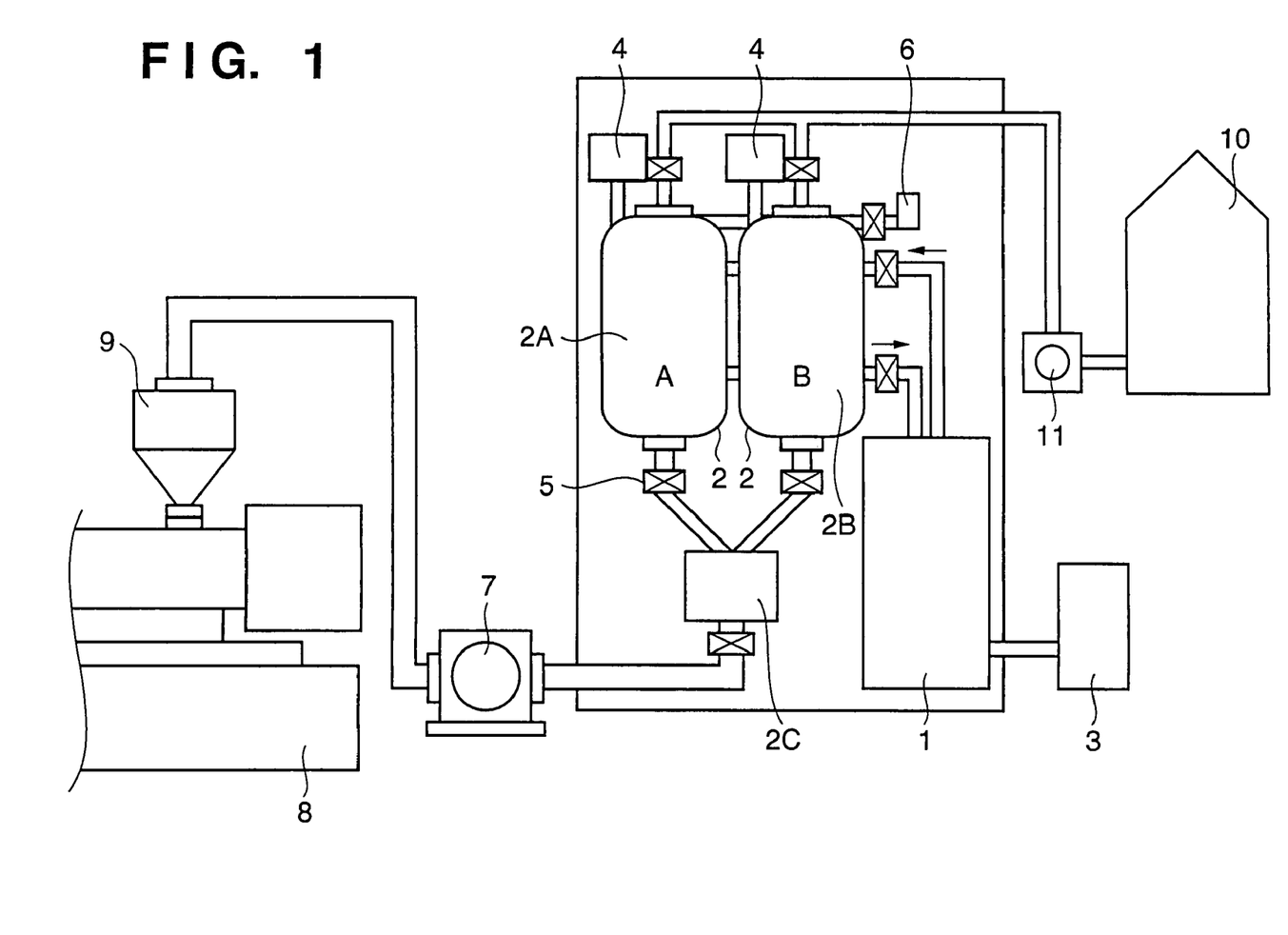
FIG. 1 is a view showing an apparatus according to an embodiment of the present invention.

FIG. 1 is a view showing the arrangement of a foam molding apparatus according to an embodiment of the present invention. Referring to FIG. 1, reference numeral 1 denotes a high-pressure gas manufacturing unit; 2, pressure vessels; 3, a gas manufacturing unit; 4, agitators; 5, a solenoid valve; 6, a solution supply unit; 7, a supply pump; 8, an injection molder; 9, a hopper; 10, a material silo; and 11, a material feeder. The gas manufacturing unit 3 has the function of extracting an inert gas from the atmosphere.

The operation will be described with reference to FIG. 1.

Usually, a resin material is carried by a tank truck or in a 25-kg resin bag, and is stored in the material silo 10. The material stored in the material silo 10 is fed by the material feeder 11 to the pressure vessels 2 through material feed pipes and solenoid valves. The pressure vessels 2 are connected to the high-pressure gas manufacturing unit 1 by pipes through solenoid valves. When a predetermined amount of material is supplied to the pressure vessels 2, the solenoid valves of the pressure vessels 2 are closed, and the high-pressure gas manufacturing unit 1 supplies an inert gas to the pressure vessels 2.

When the pressures of the inert gas in the pressure vessels 2 rise to predetermined values, the solenoid valves are closed. This state is maintained for a predetermined period of time, so the inert gas is penetrated into the resin material. The pressure vessels 2 incorporate agitating plates connected to the agitators 4. The agitating plates are constantly rotated at a predetermined rotational speed, thereby agitating the material. The temperature in each pressure vessel 2 is controlled by a heater 25 and temperature controller 26 (see FIG. 3) in accordance with the type of the material. Usually, the temperature is managed between 25° C. and 35° C. The pressure is 4 MPa to 6 MPa, and the process time is about 2 hrs.

As shown in FIG. 1, the apparatus according to this embodiment has a plurality of pressure vessels. When a preset time elapses, an appropriate amount of the resin material is transferred to a pressure vessel 2C. The transfer amount is determined by the capacity of the hopper 9 provided to the injection molder, the weight of the foamed product per shot, and the molding cycle. Usually, a resin amount corresponding in molding time to about 30 min is transferred. Although the capacity of the pressure vessel 2C is smaller than those of pressure vessels 2A and 2B, its inner pressure is managed and controlled in the same manner as those of the pressure vessels 2A and 2B. When the material is to be transferred from the pressure vessel 2A or 2B to the pressure vessel 2C, the outlet solenoid valve of the pressure vessel 2C is closed, to prevent the pressure in the pressure vessel 2A or 2B from dropping to the atmospheric pressure.

When the resin material is to be transferred from the pressure vessel 2C to the hopper 9, the solenoid valve 5 between the pressure vessel 2A or 2B and the pressure vessel 2C is closed. The high-pressure gas in the pressure vessel 2C is mostly recovered once by the high-pressure gas manufacturing unit 1. Usually, the resin material processed in the pressure vessel 2A or 2B at 6 MPa for about 2 hrs is transferred to the pressure vessel 2C and then sequentially to the hopper 9, plasticized by the injection molder 8, and injected into a mold to form a resin foamed product.

Figure 2:
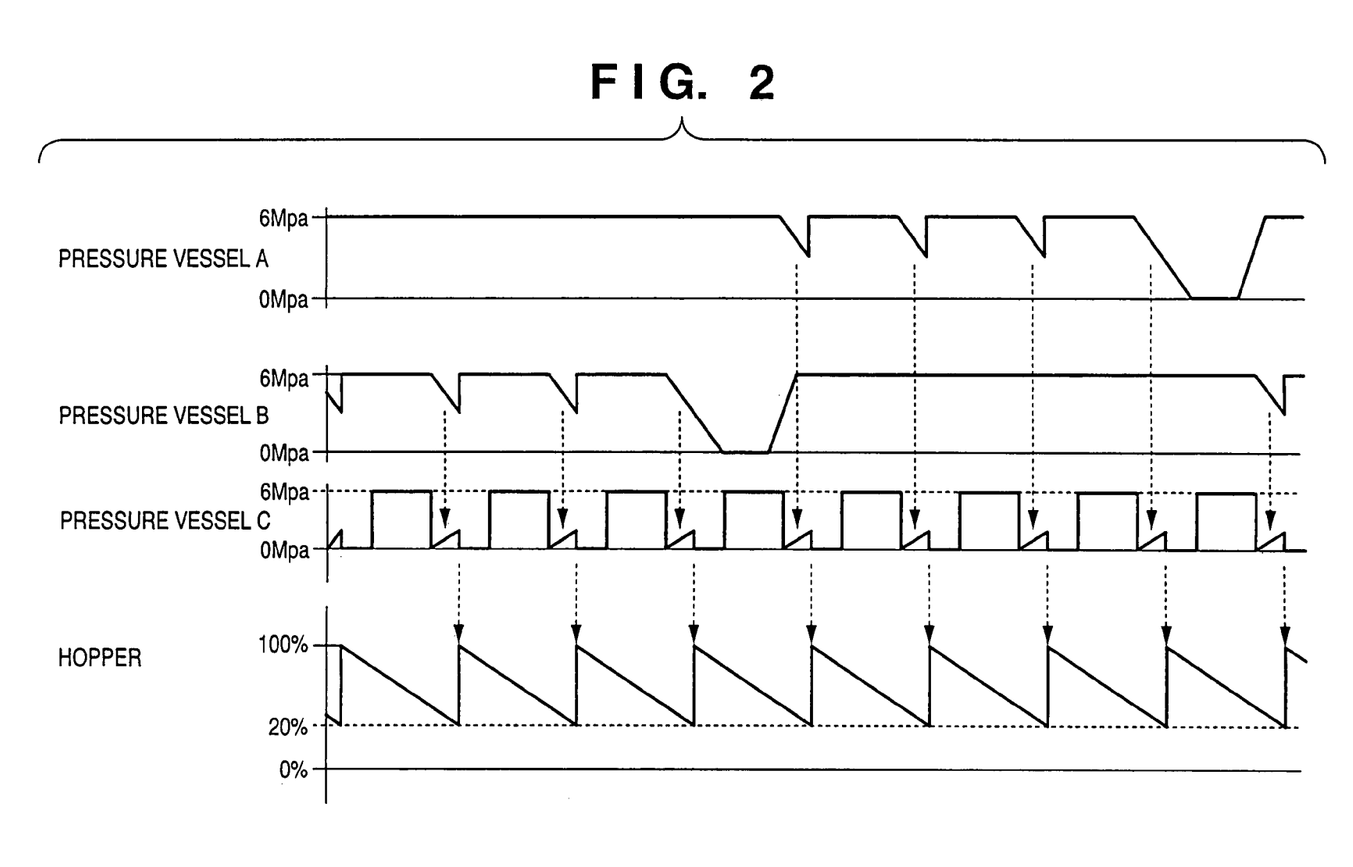
FIG. 2 is a timing chart showing the operation of the apparatus.

FIG. 2 is a timing chart showing the outline of the operation of the apparatus according to this embodiment.

In FIG. 2, "pressure vessels A, B, and C" respectively indicate changes of the pressures in the pressure vessels 2A, 2B, and 2C over time, and "hopper" indicates the resin amount in the hopper 9. Arrows in FIG. 2 show the transfer flow of the resin material.

The material is transferred from the pressure vessel 2B to the pressure vessel 2C once every 30 min, and then to the hopper 9. The resin amount in the hopper 9 fluctuates between 20% and 100%. When transfer is performed four times, that is, a total of 2 hrs elapses, the pressure vessel 2B stops supply to the pressure vessel 2C, and the material is supplied from the pressure vessel 2A to the pressure vessel 2C. A new resin material is supplied from the material feeder 11 to the pressure vessel 2B, and is pressurized again at 6 MPa for 2 hrs. In other words, supply of material to the pressure vessel 2C is performed by the pressure vessels 2A and 2B alternately at a certain period of interval time (2 hrs in this case).

Figure 3:
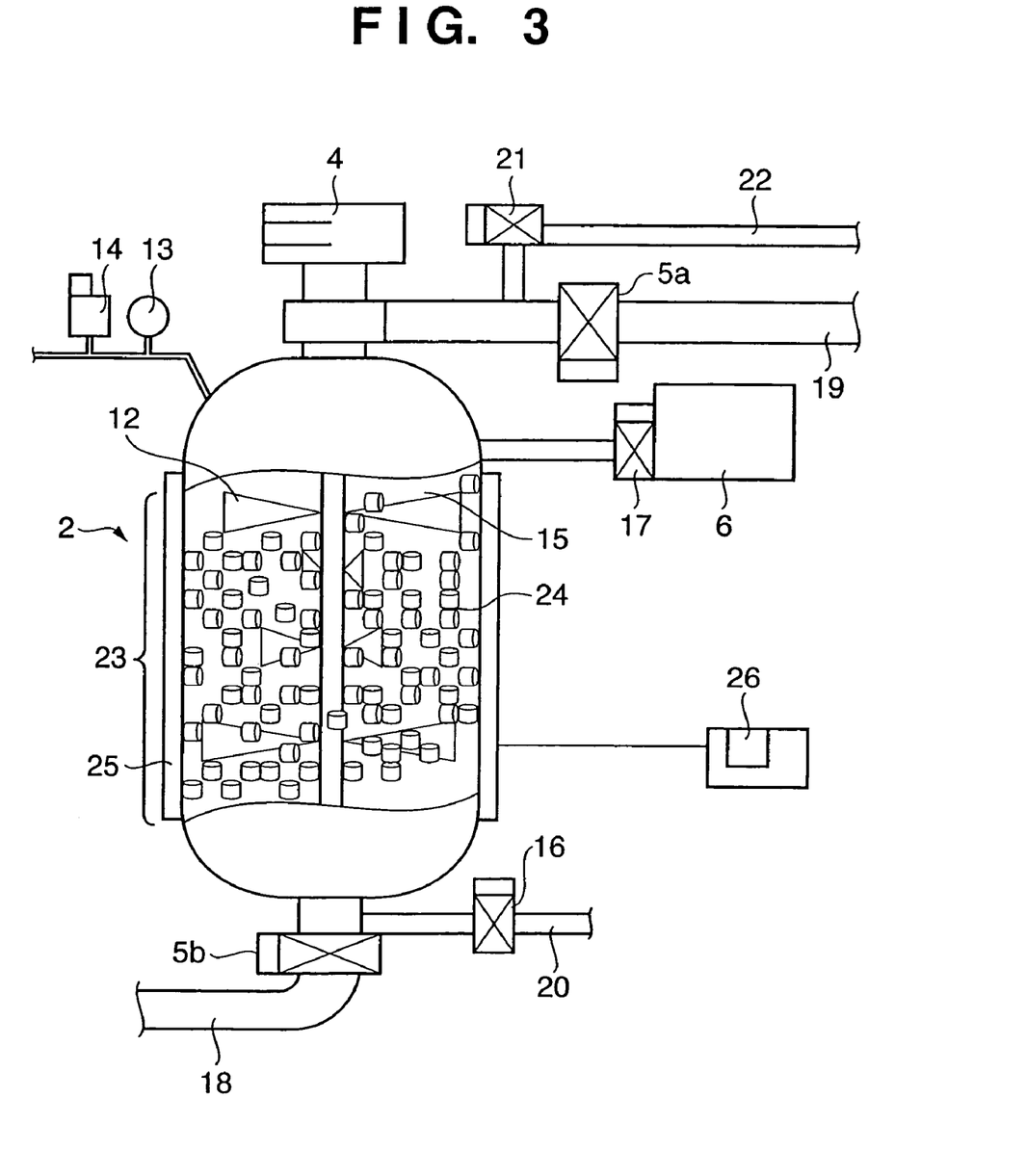
FIG. 3 is a detailed view of the interior of a pressure vessel.

FIG. 3 shows the interior of the pressure vessel 2 of this embodiment in detail.

Referring to FIG. 3, reference numeral 12 denotes an agitating plate; 13, a pressure gauge; 14, a safety valve; 15, an inert gas; 16, an exhaust solenoid valve; 17, a solution supply port solenoid valve; 18, a pipe connected to the pressure vessel 2; 19, a pipe connected to the material feeder 11; 20, a pipe connected to the high-pressure gas manufacturing unit; 21, a gas inlet solenoid valve; 22, a pipe connected to the high-pressure gas manufacturing unit 1; 23, a section showing the interior of the pressure vessel 2; 24, a resin material; 25, the heater; and 26, the temperature controller.

The operation will be described with reference to FIG. 3.

The resin material 24 is stored in the pressure vessels 2, and is agitated by rotation of the agitator 4 and agitating plate 12. Hence, the entire surface of the resin material 24 comes into contact with the inert gas 15, so the inert gas 15 is uniformly penetrated into the resin material pellets. Usually, rotation with a comparatively low rotational speed of 10 rpm to 30 rpm is employed.

The solution supply unit 6 is attached to the pressure vessel 2 through the solution supply port solenoid valve 17. The solution supply unit 6 incorporates a solution tank, a metering unit, and an injection unit, and can supply only a preset amount of the solution into the pressure vessel 2. In the case of a PPE resin material, 3 cc to 5 cc of isopropyl alcohol are supplied to a 200-L pressure vessel.

Figure 4:
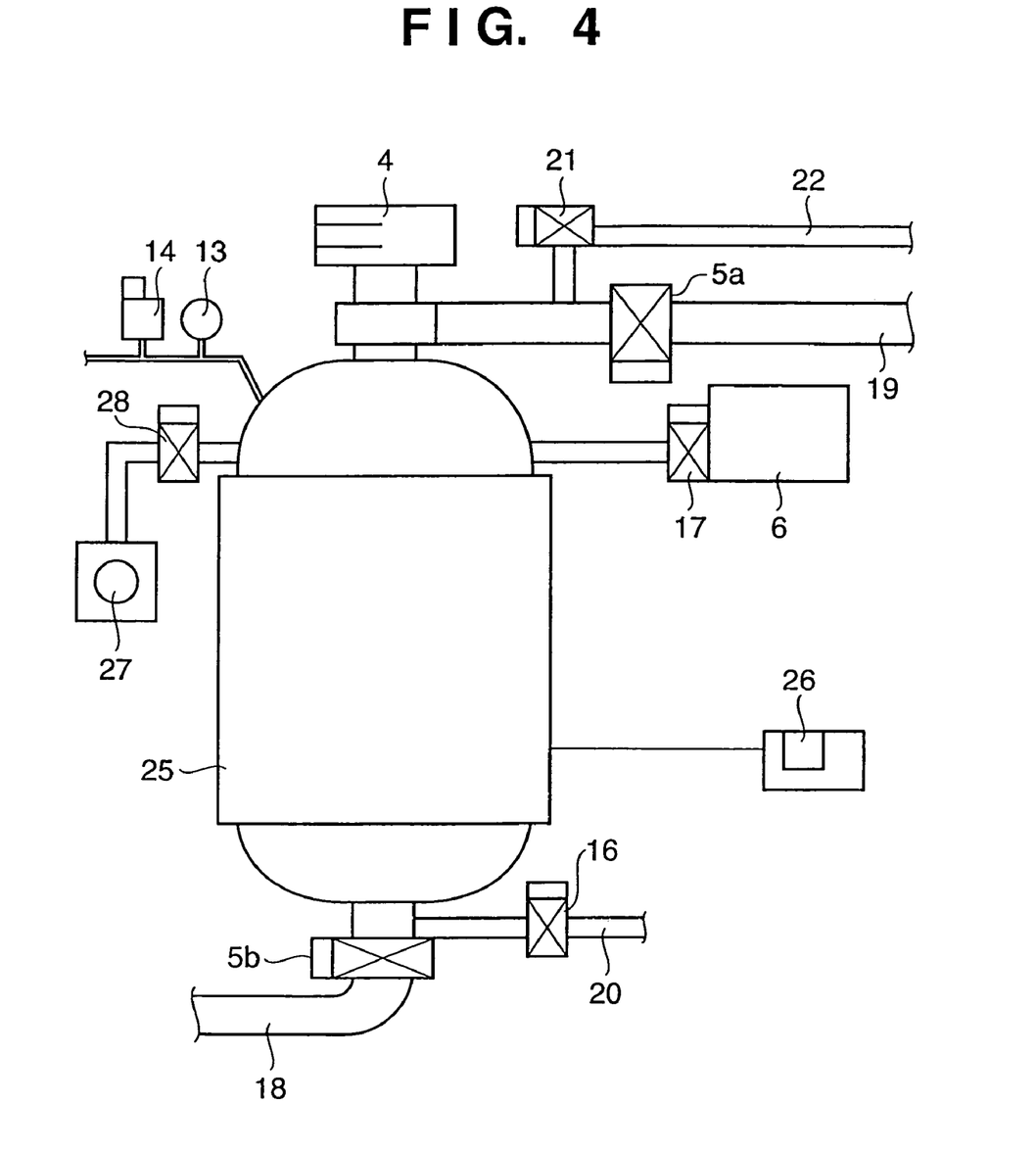
FIG. 4 is a detailed view of a pressure vessel portion.

The solution supplied from the solution supply unit 6 gasifies in the pressure vessel 2 by a pressure reducing unit having a vacuum pump 27 shown in FIG. 4, to uniformly penetrate into the resin material. The pressure in the pressure vessel 2 during pressurization is monitored by the pressure gauge 13. When the pressure increases to a specified value or more, the safety valve 14 operates to reduce the pressure to the specified value.

As the penetration speed and amount of the inert gas into the resin material change depending on the pressure, time, and temperature, the temperature of the pressure vessel 2 is controlled by the heater 25 and temperature controller 26 to a predetermined value. This temperature is less than the thermal deformation temperature of the resin material, and the resin material is maintained in the solid state. Hence, the inert gas is uniformly penetrated into the resin material.

FIG. 4 is a detailed view of the pressure vessel portion of this embodiment, in which reference numeral 27 denotes the vacuum pump; and 28, a vacuum pump solenoid vale.

The operation will be described with reference to FIG. 4.

As described above, after the resin material is charged into the pressure vessel 2, the interior of the pressure vessel 2 is set in a reduced pressure state by the vacuum pump 27. After that, the solution supply port solenoid valve 17 is opened, and the solution is supplied to the pressure vessel 2 and agitated for a predetermined period of time. When the predetermined agitating time has elapsed, the gas inlet solenoid valve 21 is opened to supply the inert gas. During pressure increase, all the solenoid valves are closed except for the one on the inert gas supply line. When the pressure increases to a specified value, the gas inlet solenoid valve 21 is also closed. When the process is performed for a predetermined period of time, a solenoid valve 5b is opened, so the resin material is fed to the pressure vessel 2C.

Figure 5:
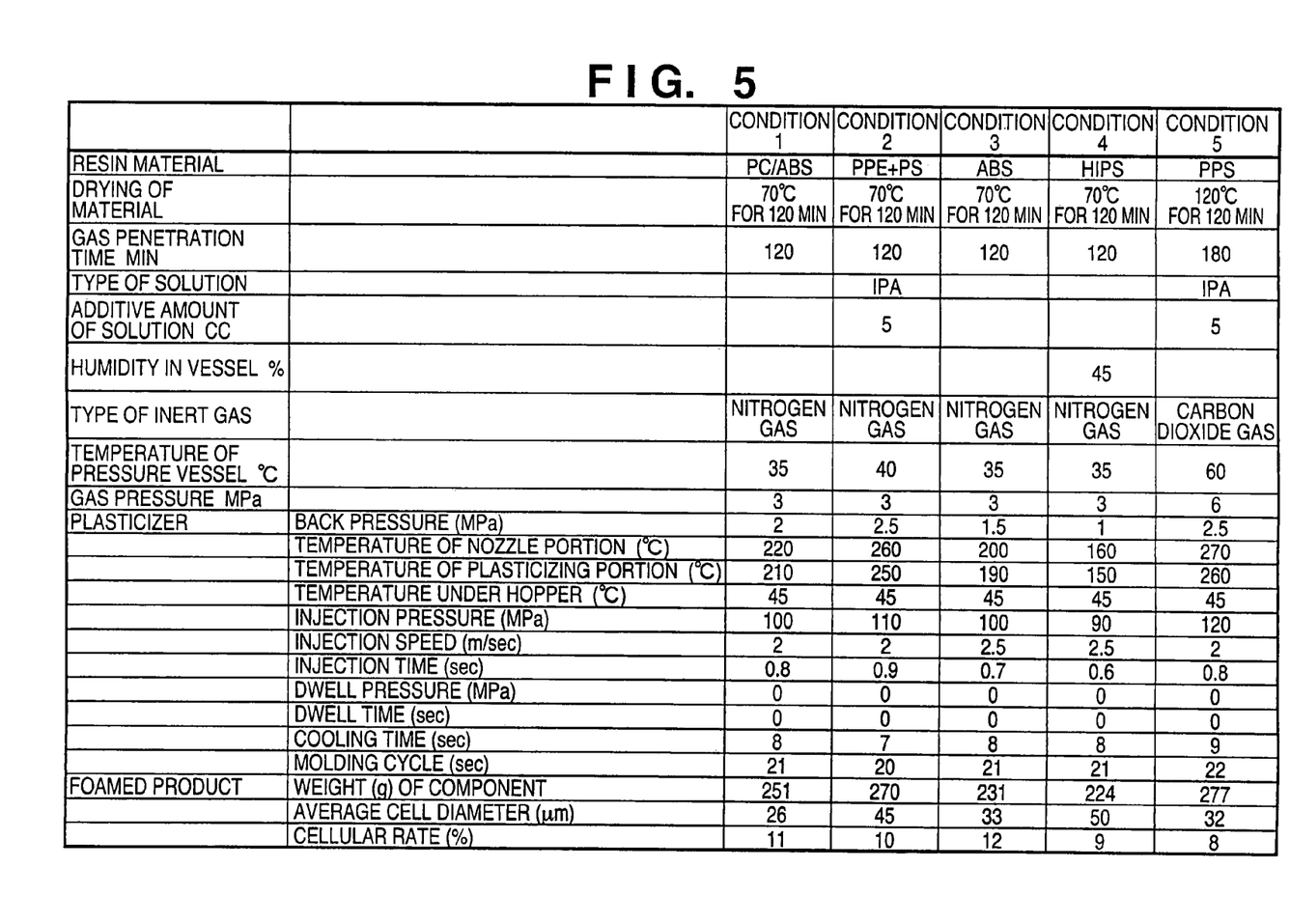
FIG. 5 is a table showing processing conditions employed when processing is performed with the apparatus shown in FIG. 1.
Figure 6:
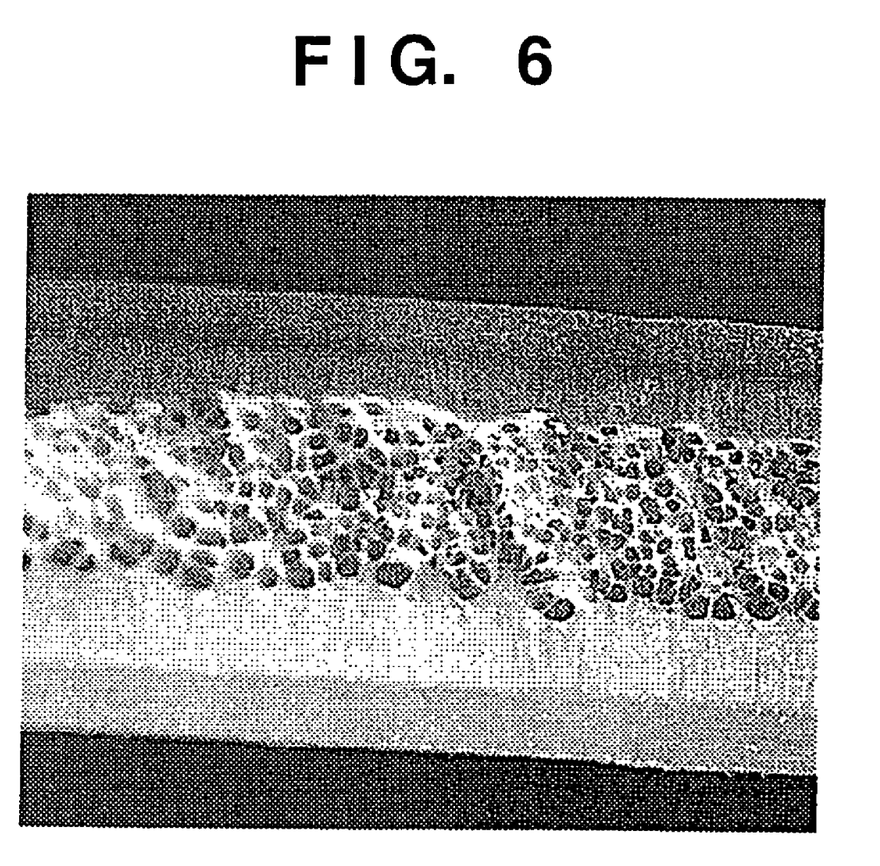
FIG. 6 is a photograph showing the state of cells of a section of a molded product.

FIG. 5 shows processing conditions employed when processing is performed with the apparatus shown in FIG. 1 of this embodiment, and FIG. 6 shows the state of cells of a section of the resultant foamed product.

As described above, according to the above embodiment, the resin material is set in a high-pressure inert gas while it is being agitated in the pressure vessel. This allows the inert gas to penetrate uniformly into the resin material. The plurality of pressure vessels are sequentially switched at a predetermined interval, and the gas-penetrated material is fed to them. Therefore, the foaming resin material can be supplied stably.

According to this embodiment, as described above, since the inert gas is not injected into the molten resin material, the gas and resin are mixed uniformly during plasticization of the resin material. Since all the resin pellets uniformly contain the gas, nonuniform dispersion of the foaming material (gas) for cell formation, which poses an issue in the conventional master batch scheme, is solved. Conventionally, the productivity is poor because of the low dissolution rate of the inert gas into a solid resin material. Regarding this, the dissolution rate increases remarkably because of the use of an alcohol-based solution and humidity management, which are the characteristic features of this embodiment. Also, partly because of foaming resin interval supply, which is described earlier, by the plurality of pressure vessels as well, the productivity is improved remarkably.

In other words, according to this embodiment, the inert gas as the foaming material can be uniformly dissolved and dispersed in the resin material, and the productivity is improved remarkably. According to the conventional method described above, a gas is blown into a molten resin by attaching a gas injection unit to the cylinder of the injection molder. When compared to this conventional method, according to this embodiment, the conventional (existing) injection molder need not be modified at all. This is effective in capital investment as well.

As has been described above, according to the above embodiment, cells can be uniformly dispersed in the foamed product.

The present invention is not limited to the above embodiments and various changes and modifications can be made within the spirit and scope of the present invention. Therefore, to apprise the public of the scope of the present invention the following claims are made.

What is claimed is:

1. An apparatus for supplying a resin material to a hopper of an injection molder, comprising:
    a vessel for storing a resin material; and
    controlling means for supplying a pressurized inert gas to an interior of said vessel and controlling the supplied inert gas to a state of a predetermined temperature and a predetermined pressure which is not a super-critical state so the inert gas is absorbed by the resin material; and
    material supplying means for supplying the resin material, which has absorbed the inert gas, from the vessel to the hopper of the injection molder.

2. An apparatus according to claim 1, further comprising introducing means for introducing a liquid to said vessel.

* * * * *

UNITED STATES PATENT AND TRADEMARK OFFICE
CERTIFICATE OF CORRECTION

PATENT NO. : 7,083,403 B2
APPLICATION NO. : 11/107813
DATED : August 1, 2006
INVENTOR(S) : Takashi Arai It is certified that error appears in the above-identified patent and that said Letters Patent is hereby corrected as shown below:

COLUMN 3:

Line 10, "according the" should read --according to the--.

COLUMN 6:

Line 31, "vale." should read --valve.--.

Signed and Sealed this

Eighteenth Day of December, 2007

JON W. DUDAS
*Director of the United States Patent and Trademark Office*